Jan. 17, 1956  G. P. BOSOMWORTH  2,731,537
MOISTURE TRAP FOR ELECTRONIC CURING ASSEMBLY
Filed Oct. 28, 1950  4 Sheets-Sheet 3
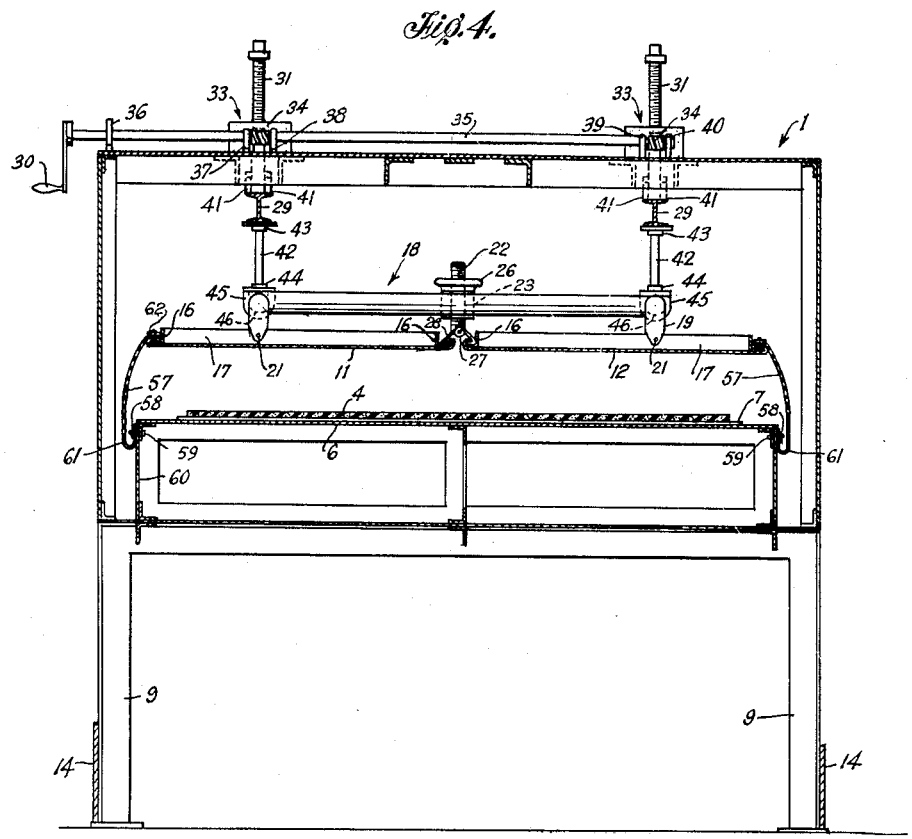
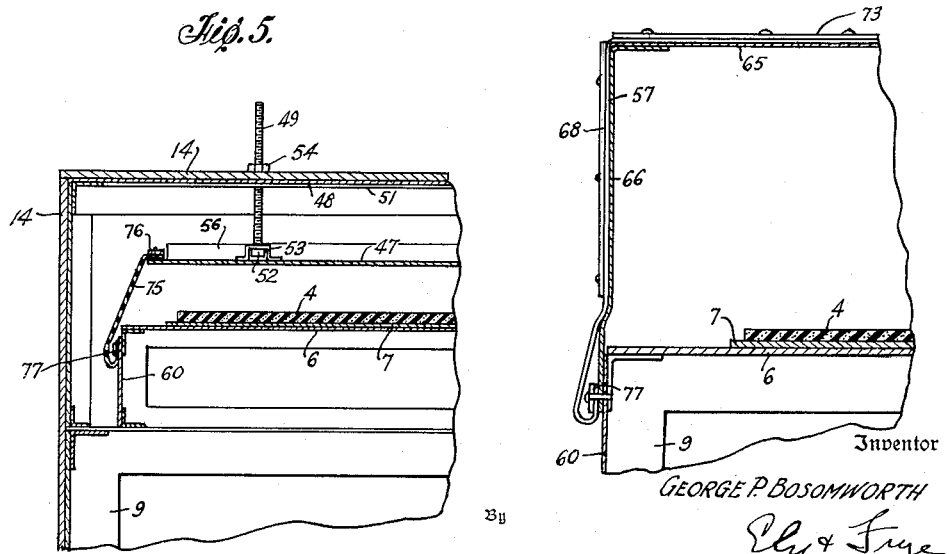
Inventor
GEORGE P. BOSOMWORTH
Ely & Frye
Attorneys

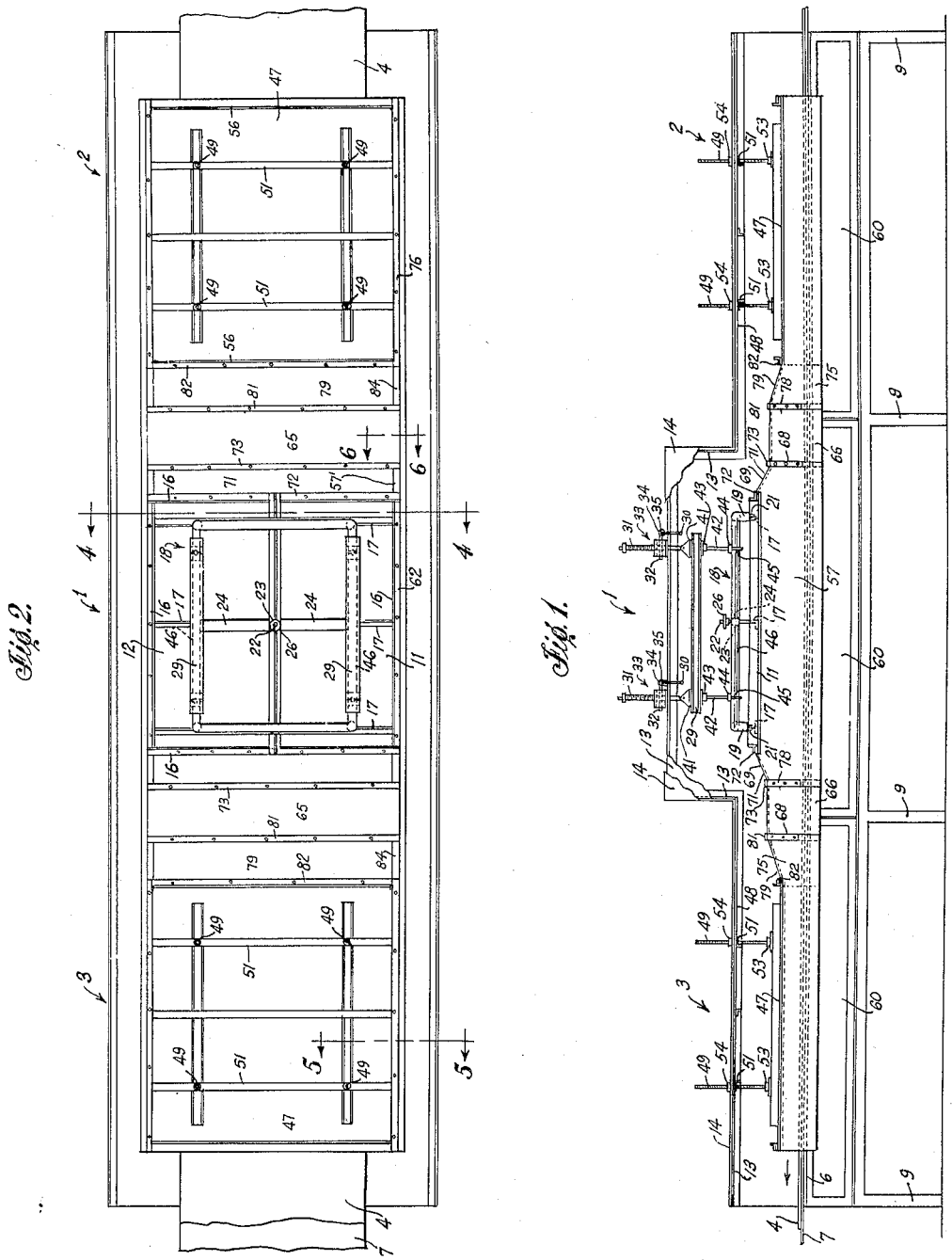

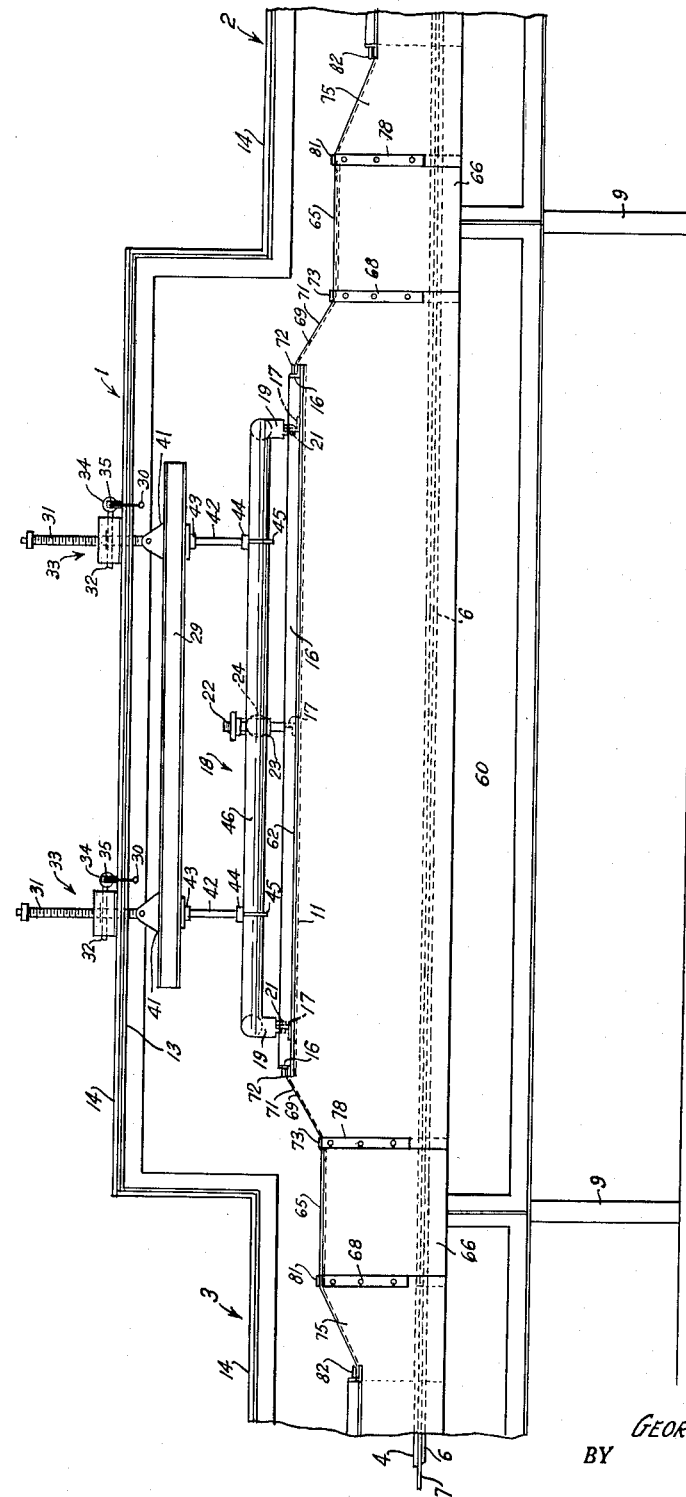

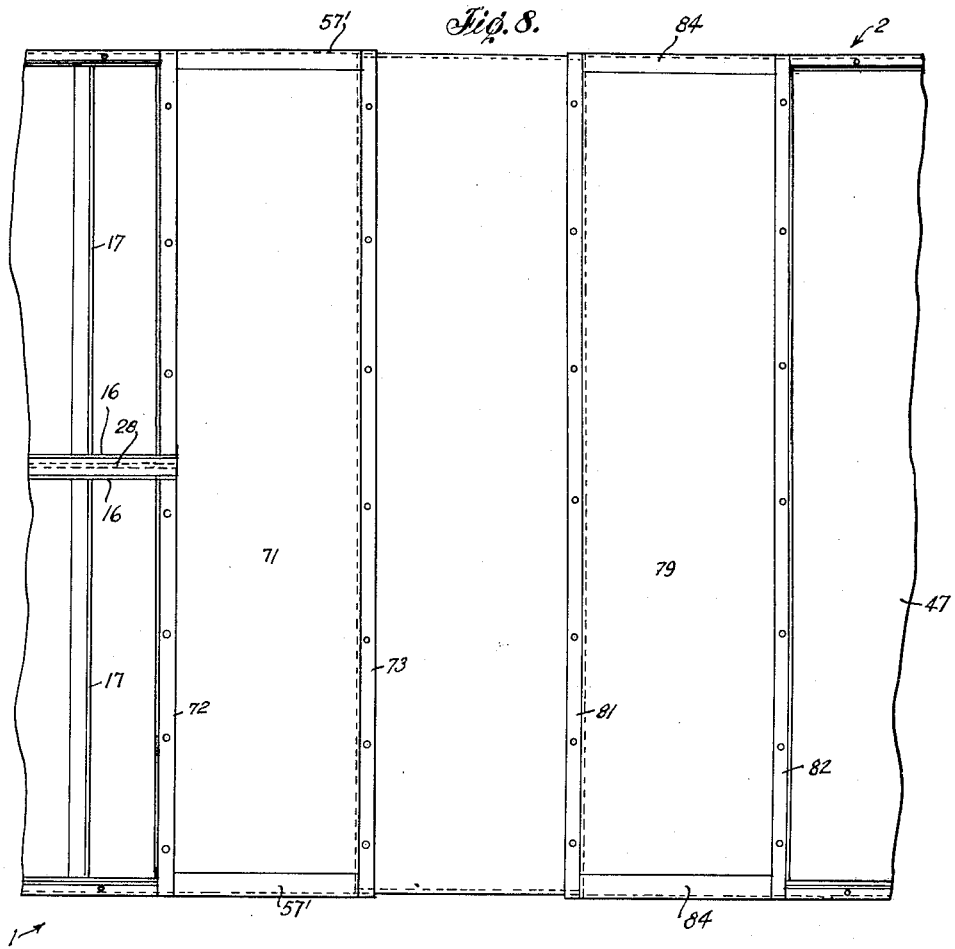
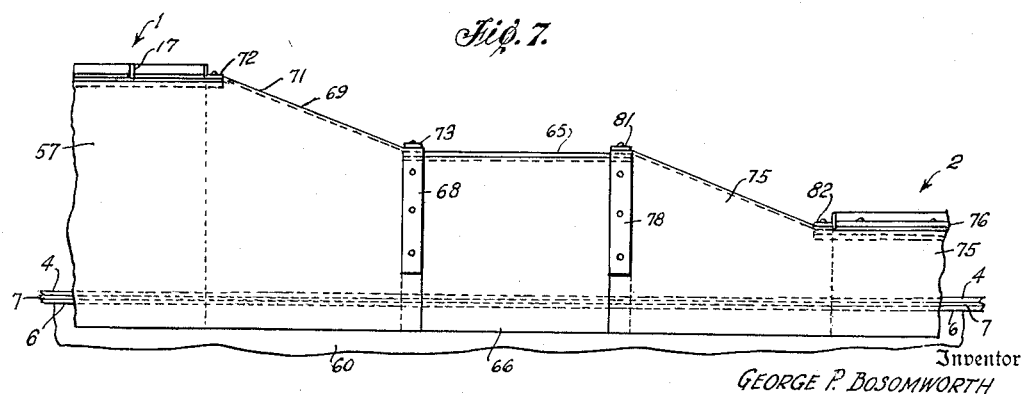

United States Patent Office 2,731,537
Patented Jan. 17, 1956

2,731,537

MOISTURE TRAP FOR ELECTRONIC CURING ASSEMBLY

George P. Bosomworth, Akron, Ohio, assignor to The Firestone Tire & Rubber Company, Akron, Ohio, a corporation of Ohio Application October 28, 1950, Serial No. 192,802

6 Claims. (Cl. 219—10.71)

This invention relates to an electronic curing device for rubber-like materials such as sponge rubber, particularly in the type of installations wherein a continuously moving sheet of the material is cured while passing between electrodes in a curing oven. Conventional devices of this nature comprise a central oven with a vertically adjustable, upper electrode, and are equipped, at each end of the oven, with wave traps, which serve to cut down radiation losses. However, they have consisted of a generally loose framework with open spaces freely venting to the atmosphere. Porous rubber products in the formed state, but prior to curing, include a considerable amount of moisture in the interstices. In the electronic methods of curing, this moisture is beneficial in that it possesses a loss factor which materially assists in the generation of heat in a high frequency field to a degree in excess of what would be generated in the rubber product in the dry state. Furthermore, moisture is retentive of heat and, therefore, in the presence of moisture, the curing process is attended with increased efficiency as to power consumed.

With the conditions of venting in the ovens, as mentioned above, the steam generated quickly escapes and represents a distinct loss of power, as well as resulting in an erratic or imperfect cure. Under these conditions, it has been possible, in the prior art ovens, to effect a cure through adjustment of power input and other factors, but in order to arrive at equilibrium conditions, wherein loss of vapor is balanced, a considerable amount of material must first pass through the apparatus without attaining satisfactory cure. This entails a waste which, for the material considered, is prohibitive.

It is to the relief of these conditions that the present invention is directed. I have found that by providing covering elements or blankets at those portions of the apparatus heretofore in exposed condition, a quick, uniform, and in all ways satisfactory cure is possible for all of the material passed through the oven, with a uniform and minimized power consumption and without waste of material.

It is, therefore, an object of the invention to accelerate the attainment of full curing action of materials in an electronic oven. Another object is to attain such a result without necessity for additions to or modification of the raw material. A still further object is to increase the efficiency of power consumption in an electronic curing device by utilizing the components normally present in the raw material.

These and other objects are readily attained by the present invention, an embodiment of which is described in the following detailed specification, as illustrated in the drawings, in which:

Fig. 1 is a side elevation of a curing oven and its end passages, or wave traps, with outside walls broken away to show elements on the inside, Fig. 2 is a top plan view of Fig. 1 with the top plates of the main oven and wave traps removed, Fig. 3 is an enlarged view of the oven portion of Fig. 1.

Fig. 4 is a sectional view taken on the line 4—4 of Fig. 2.

Fig. 5 is an enlarged detail taken on the section line 5—5 of Fig. 2,

Fig. 6 is an enlarged detail taken on the section line 6—6 of Fig. 2,

Fig. 7 is an enlarged view of the portion of Fig. 1 between the oven and the right hand wave trap, and Fig. 8 is a top plan view of the portion shown in Fig. 7.

Referring to the drawings by characters of reference, there is shown a curing apparatus composed of three main units, a central, curing oven, designated generally by the numeral 1, and connecting radiation traps 2 and 3 on the two ends of the oven and attached thereto. The porous rubber sheet 4 moves in the direction of the arrow in Fig. 1 and passes successively through radiation trap 2, oven 1, and radiation trap 3. This general arrangement is conventional and the radiation traps are of a length equal to about one-quarter of a wave length of the average radiation employed in the oven so as to dissipate the radiation in its outward progress. The main purpose of this is to avoid interference with radio communication systems.

The lower electrode comprises a plate 6, constituting a common bottom for the oven and the two radiation traps. A conveyor belt 7, only a portion of which is shown, is supported on and travels along the plate 6 and carries the sponge-rubber sheet 4 through the system for curing.

The oven is supported on a table having legs 9. The construction of the table and the framework of the oven need no detailed description. In general, these are fabricated from angle bars and the oven is covered on its top and sides with sheet metal 13 and an outer layer 14 of heat-insulating material.

The upper electrodes are contained entirely within the curing oven 1 and comprise a pair of plates 11, 12 (Fig. 4) suspended from the roof of the oven by a system which enables lifting and lowering of the plates 11, 12 in unison, or with variation of their angles relative to the lower electrode. Plates 11 and 12 are each reinforced by marginally located angle bars 16 and parallel, transverse ribs formed by angle bars 17. The plates are articulated to a framework 18, composed of tubular members, in a manner to provide for varying the angles which the plates make with the lower electrode. At the corners of the frame 18, dependent members 19 are pivoted as at 21 to four of the ribs 17, located near the outer edges of sheets 11, 12.

The adjacent edges of plates 11, 12 are raised or lowered simultaneously by means of a screw 22 passing through a housing 23 carried by a transverse tube 24 located midway of framework 18, the screw being raised or lowered by means of an adjusting nut 26. The lower end of screw 22 is pivoted to a lug 27 which is secured to a strip 28 having its edges folded into interlocking engagement with the inturned edges of plates 11, 12. It will be seen that by manipulation of nut 26, the angles which plates 11, 12 make with the lower electrode will be varied in a contrary or mirror-like sense.

The upper electrode unit is suspended from a pair of I-beams 29 running longitudinally of the oven, the I-beams being suspended from four adjusting screws 31, arranged in two pairs. The latter are raised or lowered by means of worm wheel 32 rotatable in a slot in a fixed block 33, threaded on screws 31, and mating with worms 34 on shafts 35, which are journaled in brackets 36, 37, 38, 39, and 40, and have a turning handle 30.

The lower ends of screws 31 are pivoted between pairs of triangular plates 41 which are secured, as by welding, to the tops of I-beams 29. Connector rods 42 of electrically insulating material are secured by means of flanges 43 to the undersides of I-beams 29, and flanges 44 on their lower ends carry saddles 45 which support the longitudinally extending tubes 46 of framework 18.

It will be seen that a variety of angular positions of plates 11, 12 is possible with the arrangement shown. This is important in the curing of sheets electronically since the thermal and electrical distribution is not constant throughout the mass of material. It is possible to smooth out such differences and attain uniform cure by adjusting the angularity of the upper electrode elements, either with respect to each other by means of screw 22, or in unison with respect to the longitudinal extent of the lower electrode by adjustment of the relative vertical heights of the respective pairs of screws 31. Or, by manipulation of handles 30 in unison, an entire upper electrode unit may be moved upward or downward as a whole.

Each radiation trap contains a vertically adjustable plate 47 suspended from the upper cover plate 48 of the trap by means of adjusting screws 49. The latter, four in number, are threaded through plate 48 and angle bar cross braces 51, welded to the underside of cover plate 48, and have a rotating anchorage, as at 52, in flanged, channel members 53 secured to plate 47. Lock nuts 54 hold the screws 49 in adjusted position. The plate 47 is thus adjustable upwardly or downwardly to minimize the volume of the conduit and retain the steam at high, thermal efficiency. Marginally located angle bars 56 reinforce plate 47 against transverse bending.

The moisture traps

Between the upper electrode and the wave traps, as well as at the sides of the upper electrode, considerable spaces occur through which vapors readily pass upwardly and are lost. To remedy this, a system of blankets is provided, covering the escape of moisture on all four sides of the upper electrode, the spaces between the upper electrode and the wave traps, and the spaces alongside the wave trap plates.

A sheet 57, of rubber or the like (Fig. 4), is secured by means of a clamp bar 58 and bolts 59 to the upright plate 60 supporting the lower electrode 6, and is folded upwardly as at 61 and secured by a clamp bar 62 to the angle bar 16 on the upper electrode 11. The arrangement of the sheet 57 is the same on both sides of the oven. The particular mode shown for attaching the blanket, with the inturned fold at the bottom, ensures a constant smoothness in the dependent skirts of the rubber sheet for any adjusted position thereof, without wrinkling.

Since the span between the upper electrode and the wave trap plate is too great for the functioning of a flexible blanket, an intermediate connecting box of rigid construction is provided. This box or tunnel (Fig. 6) comprises an upper plate 65 and side plates 66 secured to the sides of the framework of the supporting table.

Each side sheet 57 covering the electrode region extends beyond the ends of the upper electrode and overlaps the inner end of a side wall of a connector box, where it is secured by a bolted clamp plate 68. Preferably, the end portions of sheet 57 will have a slanting, upper edge 69 to accommodate the highest expected adjustment of the upper electrode. A covering for the top opening between the upper electrode and the connector box is provided in a rubber sheet 71, secured to the edge of the electrode by a clamp plate 72, and to the inner edge of the connector box by a clamp plate 73, and suitably attached, as by rubber cement, to the inwardly turned top margins 57' of sheets 57.

A sheet 75 depending from each side of plate 47 serves to continue confinement of the steam throughout the wave trap. These sheets are secured by clamp plates 76 to the edge of plate 47, and to support plate 60 by a clamp plate 77, being looped at the bottom in the same manner as sheet 57. Sheets 75 extend to the connector box and are secured at its outer, vertical edges by clamp plates 78. A sheet 79, as in the case of sheet 71, covers the top opening, being secured to the connector box by a clamp plate 81 and to plate 47 by a clamp plate 82, and being suitably secured, as by cementing, to the top margins 84 of the bridging portions of sheets 75. The said bridging portions of sheets 75 will have a form suitable for accommodation of plate 47 in its highest adjusted position.

It will be seen that with the foregoing described structure, the region through which the curing material passes from the entrance to the first wave trap to the exit from the second wave trap is completely blanketed, so that moisture is effectively retained. Not only is this concentration of moisture beneficial in retaining heat for assistance in the curing process, but is continually condensing within the enclosed space and returning to the curing material to lend assistance in the generation of heat by virtue of its favorable loss factor. Furthermore, the only avenue of escape for the vapors is through the ends of the wave traps, and those vapors which gain the entering trap will preheat the material while those which gain the exit trap will afford post-heating. This tends to smooth out the application of heat for curing purposes, and enables faster feed of material. Thus, although absolute retention of vapors is not practicable, the extended blanketing utilizes to a large extent the heat resident in escaping vapors.

Another advantage of the system resides in the fact that any tendency to fire from arcing is minimized by the trapped vapors.

While a certain preferred embodiment of the invention has been shown and described, the invention is not limited thereby since changes in the size, shape, and arrangement, for instance, of the various parts, may be made without departing from the spirit or scope of the appended claims.

What is claimed is:

1. An electronic curing assembly comprising a lower electrode, a vertically adjustable upper electrode over a portion of said lower electrode, defining a heating oven, a vertically adjustable plate over another portion of said lower electrode, spaced from said upper electrode and defining a wave trap, and a pliable, moisture-retaining sheet closing all openings between the upper electrode and lower electrode, between the said plate and lower electrode, and between said upper electrode and said plate.

2. An electronic curing assembly comprising a lower electrode, a vertically adjustable upper electrode over a portion of said lower electrode, defining a heating oven, a vertically adjustable plate over another portion of said lower electrode, spaced from said upper electrode and defining a wave trap, a rigid tunnel member intermediate said upper electrode and said plate, pliable, moisture-retaining sheets depending from the sides of said upper electrode and secured to said assembly in a manner to close the lateral, inter-electrode openings, said sheets extending to said tunnel member and including a portion closing the upper space between said upper electrode and said tunnel member.

3. In a device as in claim 2, pliable sheets depending from the sides of said plate and secured to said assembly in a manner to close the space between said plate and said lower electrode, and said latter sheets extending to said tunnel member and including a portion closing the upper space between said plate and said tunnel member.

4. In an electronic curing assembly of the type having a pair of electrodes adjustable in spaced relation to each other, flexible blanket means covering the openings between the electrodes on opposite sides thereof to form a moisture-retaining channel, and blanket means arranged transversely to the first mentioned blanket means and forming therewith an extension of said channel, said assembly having a wave trap spaced from at least one of said electrodes, the second mentioned blanket means extending to and connected with said wave trap in moisture-retaining relation, and comprising flexible, terminal portions and central rigid portions.

5. An electronic curing assembly comprising a lower electrode, a vertically adjustable upper electrode comprising a pair of plates substantially equidistant from the lower electrode and having their inner margins parallel and joined with a moisture retaining hinge to provide variable inclination of said plates with respect to the lower electrode and to each other, said upper and lower electrode defining a heating oven, a vertically adjustable plate over another portion of said lower electrode, spaced from said upper electrode and defining a wave trap, and a pliable, moisture-retaining sheet closing all openings between the upper electrode and lower electrode, between the said plate and lower electrode, and between said upper electrode and said plate.

6. An electronic curing assembly comprising a lower electrode, a vertically adjustable upper electrode over a portion of said lower electrode, defining a heating oven, a vertically adjustable plate over another portion of said lower electrode, spaced from said upper electrode and defining a wave trap, and a pliable, moisture-retaining sheet closing all openings between the upper and lower electrode, between the said plate and lower electrode, and between said upper electrode and said plate, said sheet having a fold at its lower edge adapted to fold away from the lower electrode as the upper electrode is lowered.

References Cited in the file of this patent

UNITED STATES PATENTS

| | | |
|---|---|---|
| 2,421,334 | Kline et al. | May 27, 1947 |
| 2,441,699 | Gramelspacher | May 18, 1948 |
| 2,467,230 | Revercomb et al. | Apr. 12, 1949 |
| 2,472,193 | Clayton | June 7, 1949 |
| 2,479,351 | Hagopian | Aug. 16, 1949 |
| 2,500,752 | Hanson et al. | Mar. 14, 1950 |
| 2,501,776 | Kuljian | Mar. 28, 1950 |
| 2,546,004 | Kinn | Mar. 20, 1951 |
| 2,560,763 | Griffith, Jr. | July 17, 1951 |
| 2,580,200 | Shrimpton | Dec. 25, 1951 |
| 2,586,328 | Hagopian | Feb. 19, 1952 |
| 2,626,344 | Wharff, Jr. | Jan. 20, 1953 |
| 2,629,812 | Hagopian | Feb. 24, 1953 |
| 2,650,289 | Hagopian | Aug. 25, 1953 |